United States Patent
Kwon et al.

(10) Patent No.: US 10,553,905 B2
(45) Date of Patent: Feb. 4, 2020

(54) BATTERY CELL OF NOVEL STRUCTURE WITH IMPROVED SAFETY

(71) Applicant: LG CHEM, LTD., Seoul (KR)

(72) Inventors: Sungjin Kwon, Daejeon (KR);
Dong-Myung Kim, Daejeon (KR);
Kiwoong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 14/439,121

(22) PCT Filed: Jan. 9, 2014

(86) PCT No.: PCT/KR2014/000233
§ 371 (c)(1),
(2) Date: Apr. 28, 2015

(87) PCT Pub. No.: WO2014/126338
PCT Pub. Date: Aug. 21, 2014

(65) Prior Publication Data
US 2015/0340733 A1 Nov. 26, 2015

(30) Foreign Application Priority Data
Feb. 13, 2013 (KR) .................. 10-2013-0015444

(51) Int. Cl.
*H01M 10/058* (2010.01)
*H01M 2/02* (2006.01)
(Continued)

(52) U.S. Cl.
CPC ........... *H01M 10/058* (2013.01); *H01M 2/02* (2013.01); *H01M 2/026* (2013.01);
(Continued)

(58) Field of Classification Search
CPC ...... H01M 10/058; H01M 2/02; H01M 2/026; H01M 2/0262; H01M 2/262;
(Continued)

(56) References Cited

U.S. PATENT DOCUMENTS 5,001,505 A * 3/1991 Tosaka ................... G03B 17/02
396/418
5,853,917 A 12/1998 Fauteux et al.
(Continued)

FOREIGN PATENT DOCUMENTS

CN 1770495 A 5/2006
CN 1770499 A 5/2006
(Continued)

OTHER PUBLICATIONS

English machine translation of Cheol (KR 20030066960 A) (Year: 2003).*

(Continued)

*Primary Examiner* — Stewart A Fraser
(74) *Attorney, Agent, or Firm* — Birch, Stewart, Kolasch & Birch, LLP

(57) ABSTRACT

A battery cell includes an electrode assembly mounted in a battery case. The electrode assembly includes positive electrodes, negative electrodes, and separators, wherein the separators are disposed respectively between the positive electrodes and the negative electrodes. The electrode assembly is provided with a deformation part, and has a sectional width of which is discontinuously or continuously decreased, and is formed at a portion of an outer edge of the electrode assembly. The battery case includes two or more case members, each made of a metal sheet, the case members being coupled to each other in a state in which the electrode assembly is mounted in the case members, at least one of the case members having a receiving part with an (Continued)

internal shape corresponding to the deformation part of the electrode assembly.

15 Claims, 8 Drawing Sheets

(51) Int. Cl.
    *H01M 10/0587*     (2010.01)
    *H01M 10/0583*     (2010.01)
    *H01M 10/052*     (2010.01)

(52) U.S. Cl.
    CPC ....... *H01M 2/0262* (2013.01); *H01M 2/0285* (2013.01); *H01M 2/0287* (2013.01); *H01M 10/052* (2013.01); *H01M 10/0583* (2013.01); *H01M 10/0587* (2013.01); *H01M 2/021* (2013.01); *Y02T 10/7011* (2013.01)

(58) Field of Classification Search
    CPC ............. H01M 2/0285; H01M 2/0287; H01M 10/052; H01M 10/0583; H01M 10/0587; H01M 2/021
    See application file for complete search history.

(56) References Cited

U.S. PATENT DOCUMENTS

| | | | |
|---|---|---|---|
| 6,040,082 A * | 3/2000 | Haas | A61N 1/378 429/131 |
| 6,224,995 B1 | 5/2001 | Fauteux et al. | |
| 6,630,270 B1 | 10/2003 | Kim et al. | |
| 6,746,798 B1 * | 6/2004 | Hiratsuka | H01M 2/0426 429/163 |
| 2001/0006746 A1 * | 7/2001 | Kageyama | H01M 2/0207 429/56 |
| 2003/0017383 A1 * | 1/2003 | Ura | F28D 15/0275 429/120 |
| 2006/0099501 A1 | 5/2006 | Kim et al. | |
| 2008/0137890 A1 * | 6/2008 | Petersen | H01M 4/66 381/323 |
| 2009/0086087 A1 * | 4/2009 | Kikuchi | H01M 8/04208 348/372 |
| 2009/0123829 A1 | 5/2009 | Kim et al. | |
| 2010/0143787 A1 * | 6/2010 | Jung | H01M 2/021 429/162 |
| 2010/0190064 A1 | 7/2010 | Ikeda et al. | |
| 2011/0059344 A1 * | 3/2011 | Kawase | H01M 2/0202 429/94 |
| 2011/0274967 A1 * | 11/2011 | Suzuki | H01M 2/0434 429/185 |
| 2012/0015236 A1 | 1/2012 | Spare | |
| 2012/0107654 A1 | 5/2012 | Bhardwaj et al. | |
| 2012/0115020 A1 * | 5/2012 | Hwang | H01M 10/049 429/163 |
| 2014/0304980 A1 | 10/2014 | Kim et al. | |

FOREIGN PATENT DOCUMENTS

| | | |
|---|---|---|
| CN | 101162765 A | 4/2008 |
| CN | 201392854 Y | 1/2010 |
| EP | 2 477 267 A1 | 7/2012 |
| JP | 2001-28275 A | 1/2001 |
| JP | 2005-243274 A | 9/2005 |
| JP | 2010-176996 A | 8/2010 |
| JP | 2011-253763 A | 12/2011 |
| KR | 10-0337539 B1 | 7/2002 |
| KR | 10-2003-0066960 A | 8/2003 |
| KR | 10-0440934 B1 | 7/2004 |
| KR | 10-2009-0047778 A | 5/2009 |
| KR | 10-1192619 B1 | 10/2012 |
| WO | WO 2007/091757 A1 | 8/2007 |

OTHER PUBLICATIONS

International Search Report issued in PCT/KR2014/000233, dated Apr. 4, 2014.

* cited by examiner

--PRIOR ART--

[FIG.2]
200
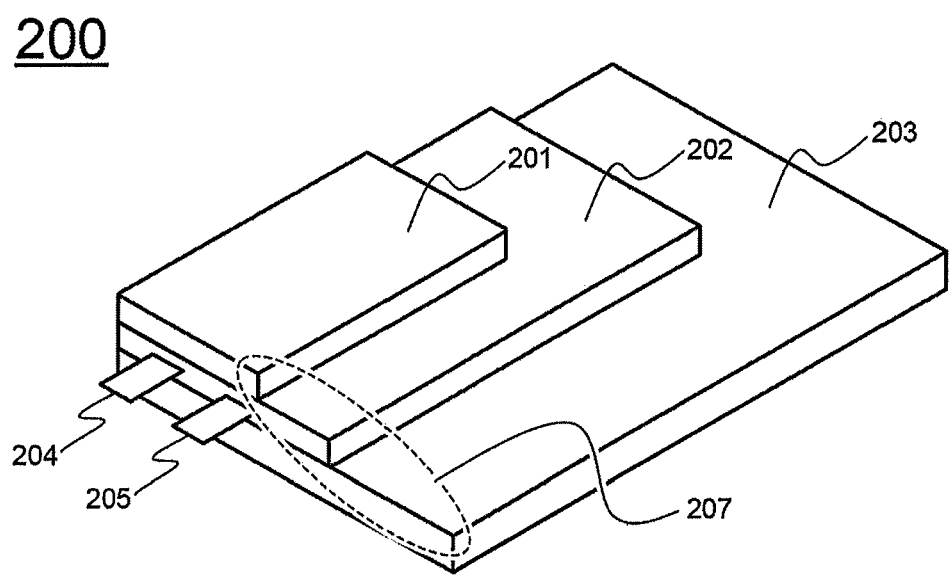

[FIG. 3]
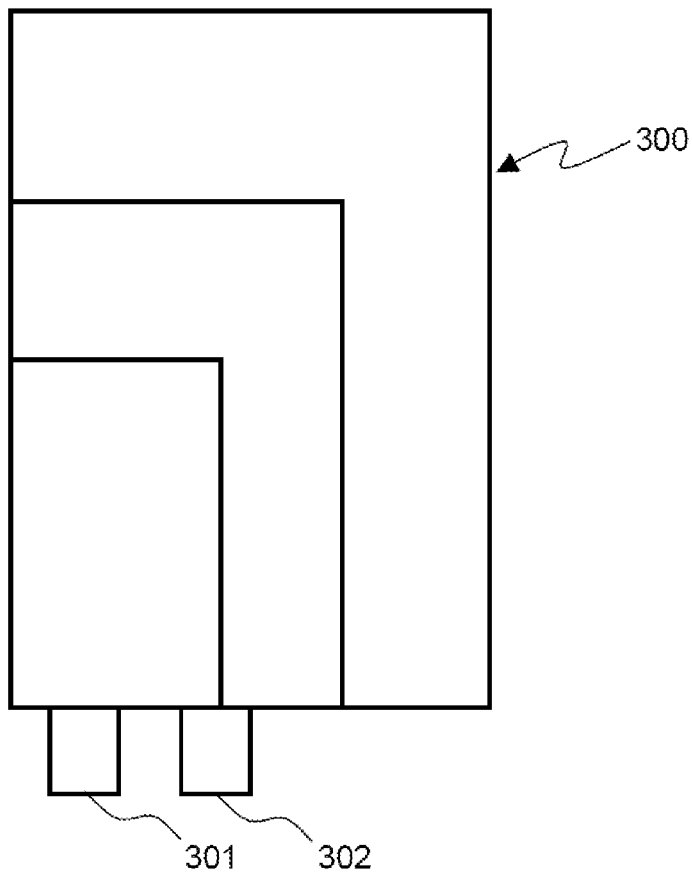
[FIG. 4]
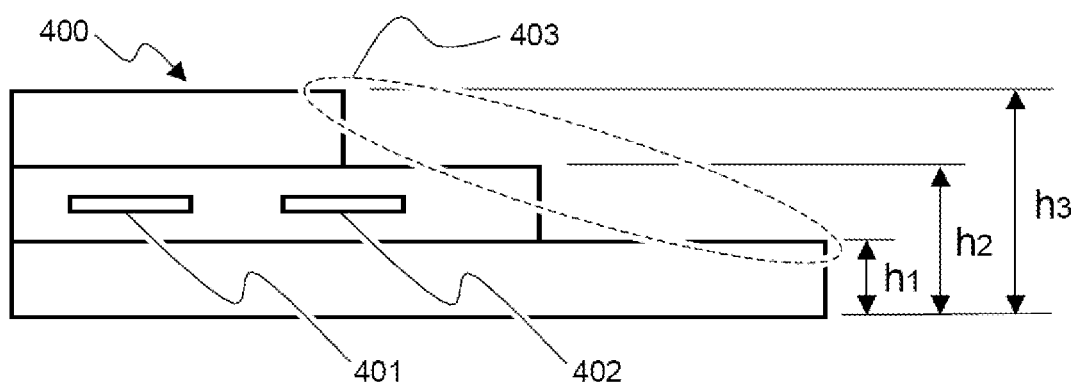

[FIG. 5]
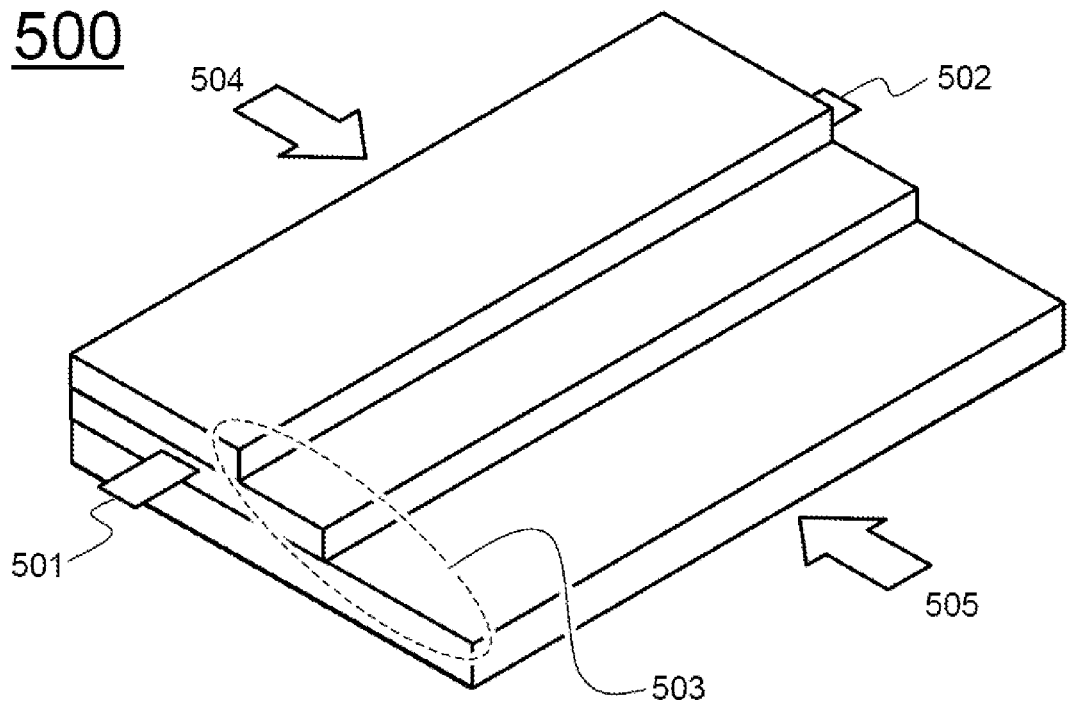
[FIG. 6]
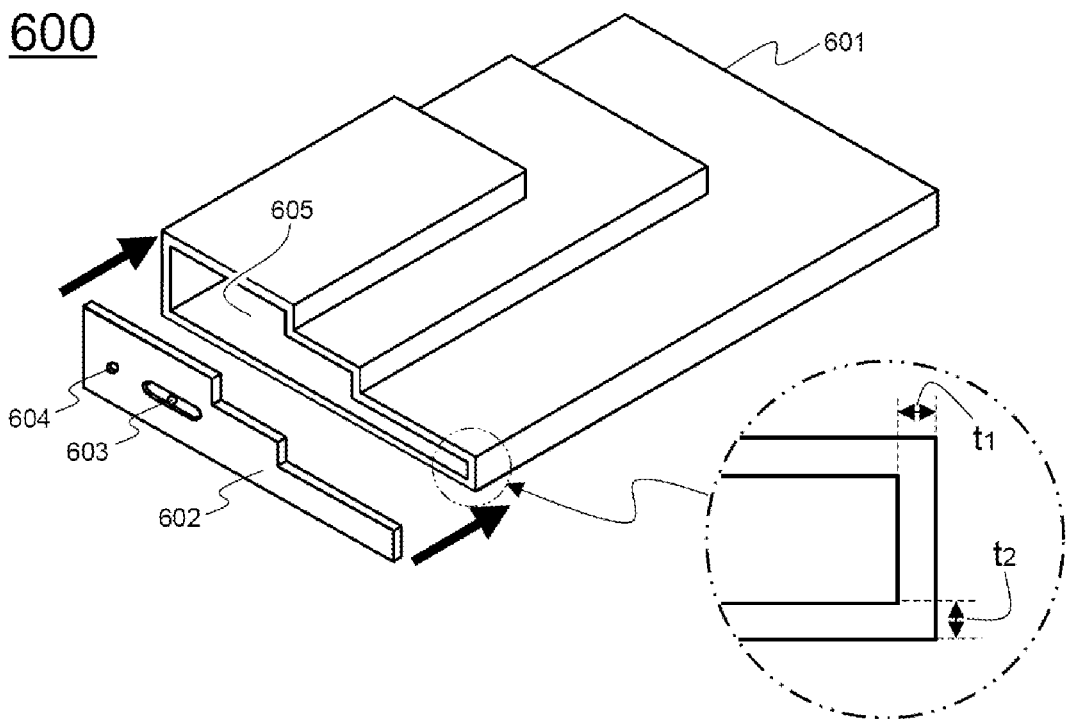

[FIG. 7]
700
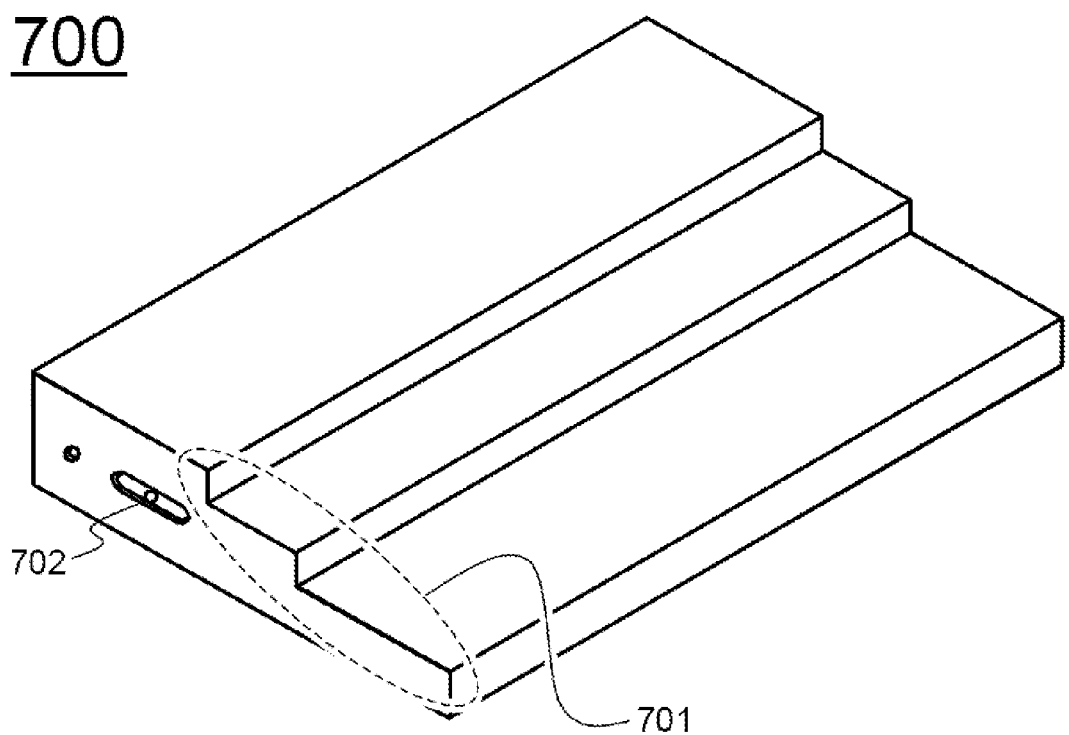

[FIG. 8]
800
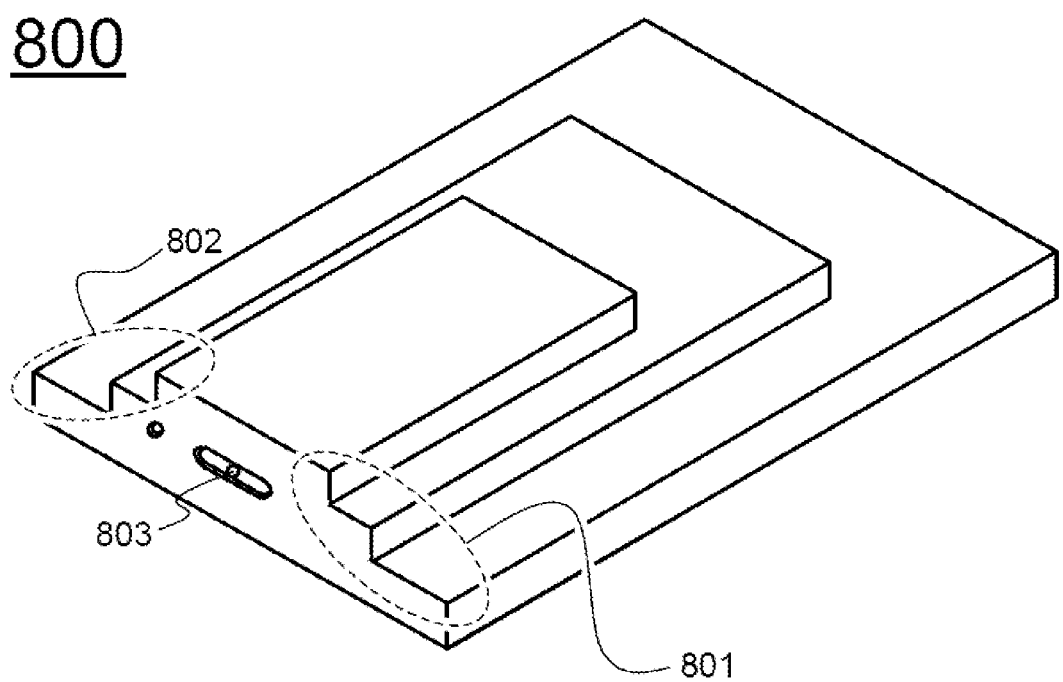

【FIG. 9】
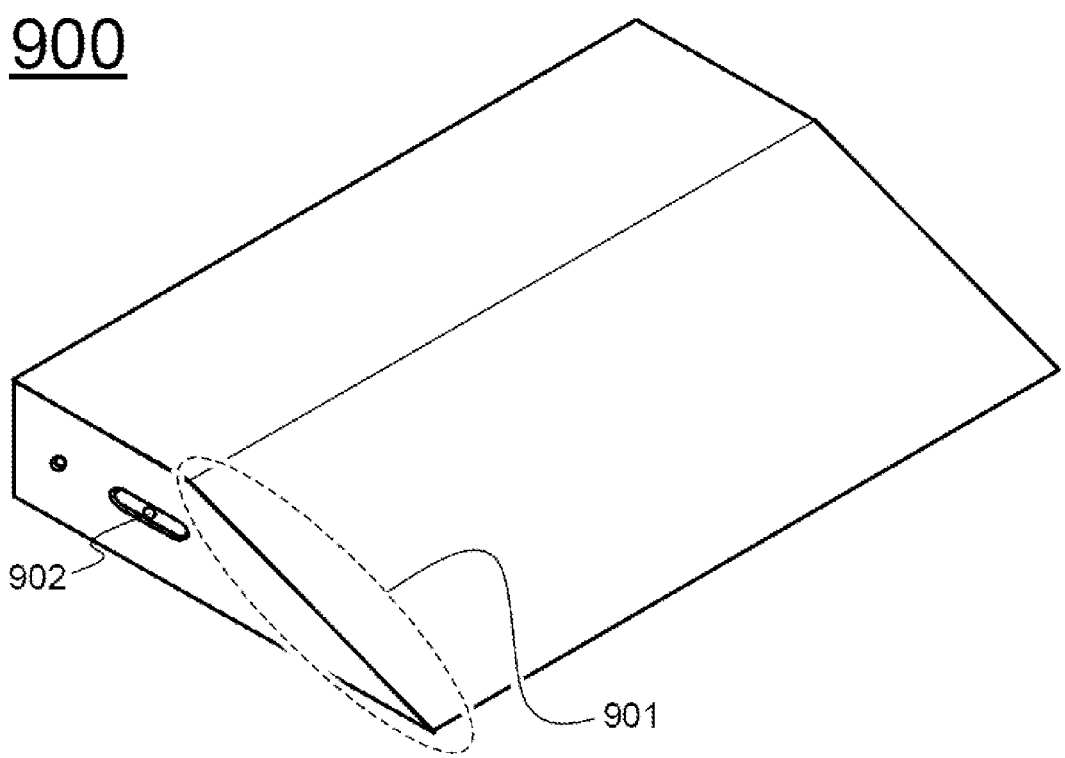

[FIG. 10]
1000
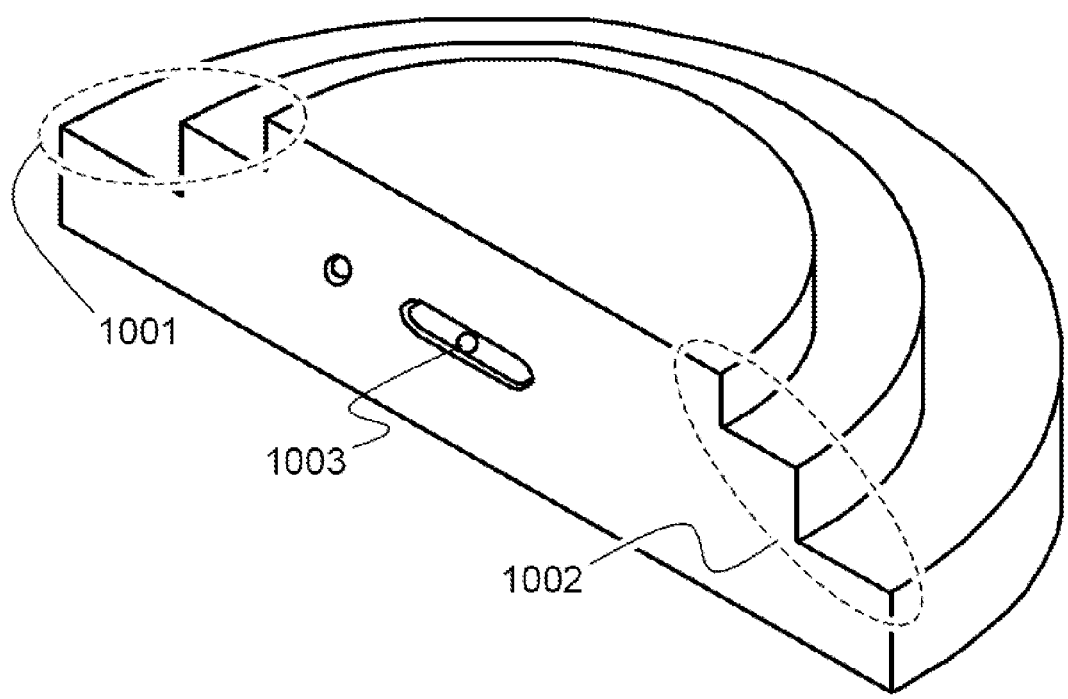

BATTERY CELL OF NOVEL STRUCTURE WITH IMPROVED SAFETY

TECHNICAL FIELD

The present invention relates to a battery cell configured to have a structure in which an electrode assembly, including positive electrodes, negative electrodes, and separators disposed respectively between the positive electrodes and the negative electrodes, is mounted in a battery case, wherein the electrode assembly is provided with a deformation part, a sectional width of which is discontinuously or continuously decreased, formed at least at a portion of an outer edge of the electrode assembly on the basis of positions of electrode terminals of the electrode assembly in a vertical section, and the battery case includes two or more case members each made of a metal sheet, the case members being coupled to each other in a state in which the electrode assembly is mounted in the case members, at least one of the case members being provided with a receiving part having an internal shape corresponding to the deformation part of the electrode assembly.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be generally classified as a cylindrical battery, a prismatic battery, or a pouch-shaped battery. Based on the type of an electrolyte, a lithium secondary battery may be also classified as a lithium ion battery, a lithium ion polymer battery, or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

In general, a pouch-shaped battery is a battery having an electrode assembly and an electrolyte in a pouch-shaped battery case, made of a laminate sheet including a resin layer and a metal layer, in a sealed state. The electrode assembly mounted in the battery case may be configured to have a jelly-roll (wound) type structure, a stacked type structure, or a combination (stacked/folded) type structure.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including positive electrodes, negative electrodes, and separators disposed respectively between the positive electrodes and the negative electrodes, each separator being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is made of a laminate sheet including an outer resin layer 20A constituting the outermost layer of the laminate sheet, an isolation metal layer 20B for preventing penetration of materials, and an inner resin layer 20C for sealing.

The positive electrode tabs 31 and the negative electrode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to secure sealing between the electrode leads 40 and 41 and the battery case 20 when the upper end 24 of the case body 21 and the upper end of the cover 22 are thermally welded to each other using the thermal welding device.

In recent years, however, a new type of battery cell has been required in accordance with a trend change for a slim type design or various other designs. To this end, research has been actively conducted into an electrode assembly and a battery case which are applicable depending upon the shape of a device, to which a battery cell is applied, and a battery cell including the same. In particular, for such a battery cell, a pouch-shaped battery, the shape of which can be easily changed depending upon that of the electrode assembly, is mainly applied.

However, the surface rigidity of the pouch-shaped battery is low. For this reason, the pouch-shaped battery may be scratched during the use of the pouch-shaped battery. In addition, the mechanical strength of the pouch-shaped battery against external impact is low with the result that the surface of the battery cell may be damaged due to physical impact. Consequently, the safety of the battery cell is not secured.

Therefore, there is a high necessity for a battery cell which is applicable depending upon the shape of a device, to which the battery cell is applied, with high durability and safety.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that when a battery cell which is applicable depending upon the shape of a device, to which the battery cell is applied, includes a battery case, which is constituted by two or more case members each made of a metal sheet, the case members being coupled to each other, wherein at least one of the case members is provided with a receiving part having a shape corresponding to that of the electrode assembly, it is possible to efficiently use an internal space of the device.

In addition, it is another object of the present invention to provide a battery cell which can be efficiently mounted even in various kinds of devices having different external shapes in addition to a rectangular shape, and exhibits high durability against external impact and thus improved safety.

Technical Solution

In accordance with one aspect of the present invention, the above and other objects can be accomplished by the provision of a battery cell configured to have a structure in which an electrode assembly, including positive electrodes, negative electrodes, and separators disposed respectively between the positive electrodes and the negative electrodes, is mounted in a battery case, wherein the electrode assembly is provided with a deformation part, a sectional width of which is discontinuously or continuously decreased, formed at least at a portion of an outer edge of the electrode assembly on the basis of positions of electrode terminals of the electrode assembly in a vertical section, and the battery case includes two or more case members each made of a metal sheet, the case members being coupled to each other in a state in which the electrode assembly is mounted in the case members, at least one of the case members being provided with a receiving part having an internal shape corresponding to the deformation part of the electrode assembly.

Consequently, the battery cell according to the present invention may be manufactured with various capacities and sizes based on the specific structure as described above. In addition, the battery cell may be mounted in various spaces of a device, in which the battery cell is mounted. Consequently, it is possible to maximally utilize an internal space of the device. Furthermore, since the battery case includes two or more case members each made of a metal sheet, it is possible to provide high durability of the battery cell against external impact and thus to improve safety of the battery cell.

The structure of the electrode assembly is not particularly restricted so long as the electrode assembly has various external shapes depending upon the shape of a device, to which the battery cell is applied. For example, the electrode assembly may be configured to have a wound type structure, a stacked type structure, a stacked and folded type structure, or a laminated and stacked type structure.

In the electrode assembly configured to have the laminated and stacked type structure, one or more radical cells, each of which is configured to have a structure in which a negative electrode, a separator, a positive electrode, and a separator are sequentially stacked or a structure in which a positive electrode, a separator, a negative electrode, and a separator are sequentially stacked, are stacked. In a case in which a plurality of radical cells is stacked to constitute the electrode assembly, a radical final cell, which is configured to have a structure in which a separator, a negative electrode, and a separator are sequentially stacked, may be disposed at the upper end of the electrode assembly.

In the electrode assembly configured to have the laminated and stacked type structure, therefore, it is possible to manufacture a secondary battery using a simple stacking process without using a folding process unlike the electrode assembly configured to have the stacked and folded type structure, thereby simplifying a manufacturing process and reducing manufacturing cost.

The electrode assemblies configured to have the wound type structure, the stacked type structure, and the stacked and folded type structure are well known in the art to which the present invention pertains, and therefore a detailed description thereof will be omitted.

In addition, the electrode assembly may be configured to have a structure in which the positive electrode terminal and the negative electrode terminal are formed at one end of the electrode assembly or a structure in which the positive electrode terminal is formed at one end of the electrode assembly and the negative electrode terminal is formed at the opposite end of the electrode assembly.

In a concrete example, the electrode assembly may have a circular, oval, or polygonal planar shape on the basis of the positions of the electrode terminals of the electrode assembly. More specifically, the electrode assembly may generally have a rectangular planar shape on the basis of the positions of the electrode terminals of the electrode assembly.

The electrode assembly may be provided with a deformation part, a sectional width of which is discontinuously or continuously decreased, formed at least at a portion of the outer edge of the electrode assembly on the basis of positions of the electrode terminals of the electrode assembly in a vertical section. In a concrete example, the deformation part of the electrode assembly may have a sectional width decreased within a range equivalent to 10 to 90% the thickness of the electrode assembly.

Specifically, the deformation part may be configured to have a stepped structure in which a sectional width of the deformation part is discontinuously decreased.

That is, the deformation part may be configured to have a structure in which a stepped part, a sectional width of which is discontinuously decreased within a range equivalent to 10 to 90% the thickness of the electrode assembly, formed at least at a portion of the outer edge of the electrode assembly on the basis of positions of the electrode terminals of the electrode assembly in a vertical section.

In another concrete example, the electrode assembly may be generally configured to have a plate-shaped hexahedral structure, and the deformation part may be formed at least at one of the opposite sides of the electrode assembly. However, the present invention is not limited thereto.

The battery case of the battery cell according to the present invention may include a first case member having a receiving part, in which the electrode assembly is received, the first case member being open at one end thereof, and a second case member coupled to the open end of the first case member for sealing the receiving part, and the second case member may be made of a plate-shaped member having a shape corresponding to the open end of the first case member.

The first case member and the second case member may be coupled to each other by welding in order to increase coupling strength and sealability.

In addition, the first case member or the second case member may be provided with an electrolyte injection hole, through which an electrolyte is injected into the receiving part such that the electrode assembly is impregnated with the electrolyte after the electrode assembly is received in the receiving part.

The material for the battery case constituting the battery cell according to the present invention is not particularly restricted so long as the material for the battery case exhibits physical properties proper to the battery case, can be formed in a plate shape, and can be used in a process of manufacturing the battery case. Specifically, the battery case may be made of aluminum or an aluminum alloy.

In addition, the battery case may have a predetermined thickness. For example, the battery case may have a thickness of 0.1 to 1 mm. If the battery case is too thick, the overall thickness or volume of the manufactured battery cell may be increased. On the other hand, if the battery case is too thin, the battery case may not have a desired mechanical strength with the result that it is not possible to protect the battery cell against external impact.

Meanwhile, the receiving part of the battery case corresponding to the deformation part of the electrode assembly may be manufactured formed using various methods. For example, the receiving part of the battery case may be manufactured by drawing or forging a metal sheet.

The kind of the battery cell according to the present invention is not particularly restricted so long as the electrode assembly having the deformation part, the sectional width of which is discontinuously or continuously decreased, formed at least at a portion of the outer edge of the electrode assembly on the basis of positions of the electrode terminals of the electrode assembly in a vertical section is mounted in the battery case. In a concrete example, the battery cell may be a lithium secondary battery having high energy density, discharge voltage, and output stability.

The composition, structure, and manufacturing method of the battery cell, including the lithium secondary battery, are well known in the art to which the present invention pertains, and therefore a detailed description thereof will be omitted.

In accordance with another aspect of the present invention, there is provided a battery pack including the battery cell mounted in a pack case. In accordance with a further aspect of the present invention, there is provided a device including the battery cell or the battery pack.

Specifically, the device may be selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage device.

The structure of the device and a method of manufacturing the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 2 is a typical view showing an electrode assembly constituting a battery cell according to an embodiment of the present invention;

FIG. 3 is a plan view showing the electrode assembly of FIG. 2 on the basis of the positions of electrode terminals thereof;

FIG. 4 is a vertical sectional view showing the electrode assembly of FIG. 2 on the basis of the positions of the electrode terminals thereof;

FIG. 5 is a typical view showing an electrode assembly constituting a battery cell according to another embodiment of the present invention;

FIG. 6 is an exploded view showing a battery case constituting a battery cell according to an embodiment of the present invention; and FIGS. 7 to 10 are typical views showing battery cells according to various embodiments of the present invention.

BEST MODE

Figure 1:
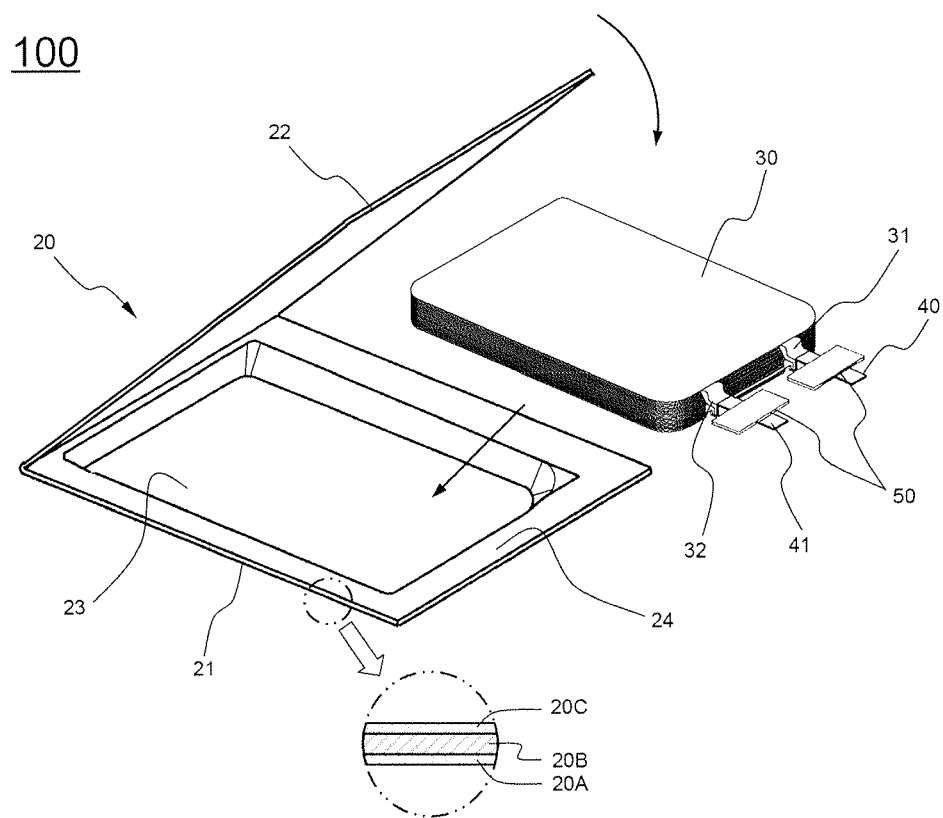
FIG. 1 is a typical view showing a conventional battery cell.

Now, exemplary embodiments of the present invention will be described in detail with reference to the accompanying drawings. It should be noted, however, that the scope of the present invention is not limited by the illustrated embodiments.

FIG. 2 is a typical view showing an electrode assembly according to an embodiment of the present invention.

Referring to FIG. 2, an electrode assembly 200 is configured to have a structure in which a positive electrode terminal 204 and a negative electrode terminal 205 are formed at one end of the electrode assembly 200, and a stepped deformation part 207, a sectional width of which is discontinuously decreased, is formed at a portion of the outer edge of the electrode assembly 200 on the basis of the positions of the electrode terminals 204 and 205 of the electrode assembly 200 in a vertical section.

The electrode assembly 200 may be configured to have a stacked type structure in which a plurality of unit cells is stacked. However, the present invention is not limited thereto. For example, the electrode assembly 200 may be configured to have a wound type structure, a stacked and folded type structure, or a laminated and stacked type structure.

The electrode assembly 200 configured to have the above-described structure enables a battery cell including the electrode assembly 200 to be manufactured with various capacities and sizes. In addition, the battery cell including the electrode assembly 200 may be easily mounted even in a space of a device in which it is difficult to mount a conventional battery cell, and a battery cell having a larger capacity may be mounted even in a limited space of the device according to the internal structure of the device. Consequently, it is possible to maximally utilize an internal space of the device.

FIG. 3 is a plan view showing the electrode assembly of FIG. 2 on the basis of the positions of the electrode terminals thereof.

Referring to FIG. 3, a positive electrode terminal 301 and a negative electrode terminal 302 are formed at one end of an electrode assembly 300, and the planar shape of the electrode assembly 300 on the basis of the positions of the electrode terminals 301 and 302 of the electrode assembly 300 is generally rectangular. However, the present invention is not limited thereto. For example, the planar shape of the electrode assembly 300 may be circular, oval, or polygonal.

FIG. 4 is a vertical sectional view showing the electrode assembly of FIG. 2 on the basis of the positions of the electrode terminals thereof.

A positive electrode terminal 401 and a negative electrode terminal 402 are formed at one end of an electrode assembly 400, and a stepped deformation part 403, a sectional width of which is discontinuously decreased, is formed at a portion of the outer edge of the electrode assembly 400 on the basis of the positions of the electrode terminals 401 and 402 in a vertical section.

In this case, sectional widths h1 and h2 of the deformation part 403 of the electrode assembly 400 may be decreased within a range equivalent to 10 to 90% a thickness h3 of the electrode assembly 400.

FIG. 5 is a typical view showing an electrode assembly constituting a battery cell according to another embodiment of the present invention.

Referring to FIG. 5, an electrode assembly 500 is configured to have a structure in which a positive electrode terminal 501 is formed at one end of the electrode assembly 500, a negative electrode terminal 502 are formed at the opposite end of the electrode assembly 500, and a stepped deformation part 503, a sectional width of which is discontinuously decreased, is formed at a portion of the outer edge of the electrode assembly 500 on the basis of the positions of the electrode terminals 501 and 502 in a vertical section.

In addition, the planar shape of the electrode assembly 500 on the basis of the positions of the electrode terminals 501 and 502 thereof is generally rectangular, and the deformation part 503 is formed at one of two opposite sides 504 and 505 of the electrode assembly 500, e.g. one side 505 of the electrode assembly 500 in this embodiment.

FIG. 6 is an exploded view showing a battery case constituting a battery cell according to an embodiment of the present invention.

Referring to FIG. 6, a battery case 600, in which the electrode assembly of FIG. 2 may be mounted, includes a first case member 601 and a second case member 602, which are coupled to each other in a state in which the electrode assembly is received in the first case member 601. The first case member 601 is provided with a receiving part 605 having an internal shape corresponding to the deformation part of the electrode assembly. One end of the first case member 601 is open such that the electrode assembly can be inserted into the receiving part 605.

The second case member 602 is made of a plate-shaped member having a shape corresponding to the open end of the first case member 601 such that the second case member 602 can be coupled to the open end of the first case member 601 to seal the receiving part 605. The second case member 602 is provided with an electrolyte injection hole 604, through which an electrolyte is injected into the receiving part 605, and a protruding terminal 603.

After the electrode assembly is inserted into the receiving part 605 through the open end of the first case member 601, the first case member 601 and the second case member 602 are coupled to each other by welding.

In addition, the first case member 601 and the second case member 602 constituting the battery case 600 are made of a metal sheet, preferably an aluminum or aluminum alloy sheet, having thicknesses t1 and t2 of 0.1 to 1 mm.

The receiving part 605 of the battery case corresponding to the deformation part of the electrode assembly according to the present invention may be formed by drawing or forging.

FIGS. 7 to 10 are typical views showing battery cells according to various embodiments of the present invention.

Referring to FIGS. 7 and 8, the planar shapes of battery cells 700 and 800 on the basis of the positions of the electrode terminals 702 and 803 thereof are generally rectangular, and stepped deformation parts 701, 801, and 802, sectional widths of which are discontinuously decreased, are partially formed at the outer edges of the battery cells 700 and 800 on the basis of the positions of the electrode terminals 702 and 803 in a vertical section.

Referring to FIG. 9, the planar shape of a battery cell 900 on the basis of the position of an electrode terminal 902 thereof is generally rectangular, and a deformation part 901, a sectional width of which is continuously decreased, is formed at a portion of the outer edge of the battery cell 900 on the basis of the position of the electrode terminal 902 in a vertical section.

Referring to FIG. 10, the planar shape of a battery cell 1000 on the basis of the position of an electrode terminal 1003 thereof is generally semicircular, and stepped deformation parts 1001 and 1002, a sectional width of which is discontinuously decreased, are formed at a portion of the outer edge of the battery cell 1000 on the basis of the position of the electrode terminal 902 in a vertical section.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention includes a battery case, which is constituted by two or more case members each made of a metal sheet, the case members being coupled to each other in a state in which an electrode assembly is mounted in the case members, wherein at least one of the case members is provided with a receiving part having a shape corresponding to that of the electrode assembly. Consequently, the present invention has the effects of efficiently using an internal space of a device, in which the battery cell is mounted, enabling the battery cell to be efficiently mounted even in various kinds of devices having different external shapes, providing high durability of the battery cell against external impact, and improving safety of the battery cell.

The invention claimed is:

1. A battery cell configured to have a structure in which an electrode assembly, comprising positive electrodes, negative electrodes, and separators disposed respectively between the positive electrodes and the negative electrodes, is mounted in a battery case,
   wherein the electrode assembly has a stepped structure in which a sectional width and a length of the electrode assembly are discontinuously decreased,
   wherein the battery case comprises two or more case members each made of a metal sheet, the two or more case members being coupled to each other in a state in which the electrode assembly is mounted in the two or more case members,
   wherein a first case member of the two or more case members includes an internal shape corresponding to the entire sectional width and length of the electrode assembly and is provided with only a single opening at a side thereof, wherein the opening of the first case member has a stepped structure that corresponds to the stepped structure of the electrode assembly and an entire internal surface of the first case member has a stepped structure that corresponds to the stepped structure of the electrode assembly,
   wherein the stepped structure of the entire internal surface of the first case member includes:
      a first portion having a substantially rectangular shape;
      a second portion being lower than the first portion, having an L shape and having a greater sectional width and length than the first portion; and
      a third portion being lower than the second portion, having an L shape and having a greater sectional width and length than the second portion, wherein the first case member is configured to receive the electrode assembly through the opening of the first case member,
   wherein a second case member of the two or more case members is coupled to the opening of the first case member for sealing a receiving part, and the second case member is made of a plate-shaped member having a shape corresponding to the opening of the first case member, and the shape of the plate-shaped member of the second case member is a step shape and the second case member is provided with a protruding terminal corresponding to an electrode terminal of the electrode assembly, wherein the second case member is provided with an electrolyte injection hole adjacent to a protruding terminal, and wherein the second case member is coupled to the first case member along a direction perpendicular to a height direction in which the first portion, the second portion, and the third portion are disposed.

2. The battery cell according to claim 1, wherein the electrode assembly is configured to have a stacked type structure.

3. The battery cell according to claim 1, wherein the electrode assembly is configured to have a structure in which a positive electrode terminal is formed at one end of the electrode assembly and a negative electrode terminal is formed at the opposite end of the electrode assembly.

4. The battery cell according to claim 1, wherein the electrode assembly has a polygonal planar shape on the basis of the positions of electrode terminals of the electrode assembly.

5. The battery cell according to claim 4, wherein the electrode assembly generally has a rectangular planar shape on the basis of the positions of the electrode terminals of the electrode assembly.

6. The battery cell according to claim 1, wherein the sectional width of the electrode assembly decreases within a range equivalent to 10 to 90% a thickness of the electrode assembly.

7. The battery cell according to claim 1, wherein the electrode assembly is generally configured to have a plate-shaped hexahedral structure.

8. The battery cell according to claim 1,
wherein an electrolyte is injected through the electrolyte injection hole into the internal surface of the first case member, and
wherein the electrolyte injection hole is present after the first and second case members are coupled together.

9. The battery cell according to claim 1, wherein the battery case is made of aluminum or an aluminum alloy.

10. The battery cell according to claim 1, wherein the battery case has a thickness of 0.1 to 1 mm.

11. The battery cell according to claim 8, wherein the first case member is formed by drawing or forging.

12. The battery cell according to claim 1, wherein the battery cell is a lithium secondary battery.

13. A battery pack comprising the battery cell according to claim 1 mounted in a pack case.

14. A device comprising the battery cell according to claim 1, wherein the battery cell is mounted in a pack case.

15. The device according to claim 14, wherein the device is selected from a group consisting of a laptop computer, a mobile phone, a portable display player (PDP), a portable multimedia player (PMP), an MP3 player, a digital still camera (DSC), a digital video recorder (DVR), a smartphone, a global positioning system (GPS), a camcorder, an electric vehicle, a hybrid electric vehicle, a plug-in hybrid electric vehicle, and a power storage device.

* * * * *